US012759212B2

(12) United States Patent
Tang et al.

(10) Patent No.: US 12,759,212 B2
(45) Date of Patent: Oct. 13, 2026

(54) METHOD FOR PREPARING PHOTOVOLTAIC MODULE INTEGRATED WITH VEHICLE BODY

(71) Applicant: OPES SOLUTIONS GMBH, Berlin (DE)

(72) Inventors: Hongxiang Tang, Jiangsu (CN); Yanquan Chen, Jiangsu (CN); Fanwei Xu, Jiangsu (CN); Handel Robert, Jiangsu (CN)

(73) Assignee: OPES SOLUTIONS GMBH, Berlin (DE)

( * ) Notice: Subject to any disclaimer, the term of this patent is extended or adjusted under 35 U.S.C. 154(b) by 57 days.

(21) Appl. No.: 18/867,297

(22) PCT Filed: May 15, 2023

(86) PCT No.: PCT/CN2023/094102
§ 371 (c)(1),
(2) Date: Nov. 19, 2024

(87) PCT Pub. No.: WO2023/221905
PCT Pub. Date: Nov. 23, 2023

(65) Prior Publication Data

US 2025/0091281 A1 Mar. 20, 2025

(30) Foreign Application Priority Data

May 19, 2022 (CN) ........................ 202210552659.2

(51) Int. Cl.
*B29C 43/36* (2006.01)
*B29C 33/38* (2006.01)
(Continued)

(52) U.S. Cl.
CPC .......... *B29C 51/12* (2013.01); *B29C 33/3835* (2013.01); *B29C 33/3842* (2013.01);
(Continued)

(58) Field of Classification Search
CPC . B29C 33/3835; B29C 33/3842; B29C 43/18; B29C 2043/181; B29C 2043/182;
(Continued)

(56) References Cited

U.S. PATENT DOCUMENTS 4,067,764 A * 1/1978 Walker .............. B32B 17/10761 156/267
6,121,542 A * 9/2000 Shiotsuka ............. H10F 77/244 438/57
(Continued)

FOREIGN PATENT DOCUMENTS

CN 102116373 A 7/2011
CN 105128943 A 12/2015
(Continued)

OTHER PUBLICATIONS

Translation of JP 2016131421 A (published on Jul. 21, 2016).*
Translation of KR 20130008783 A (published on Jan. 23, 2013).*

*Primary Examiner* — Leo B Tentoni
(74) *Attorney, Agent, or Firm* — MUNCY, GEISSLER, OLDS & LOWE, P.C.

(57) ABSTRACT

A fabrication method prepares a photovoltaic module integrated with a vehicle body. A mold includes an upper mold and a lower mold, the upper surface of the upper mold is a first forming surface, and the lower surface of the lower mold is a second forming surface; then, the two pieces are formed into a first thermoplastic material and a second thermoplastic material of a vehicle body element; the first thermoplastic material and the second thermoplastic material are moved to be between the upper mold and the lower mold; the first thermoplastic material and the second thermoplastic material are made to attach to the second forming surface and the first forming surface, respectively; the upper mold and the lower mold are driven to close, and a photovoltaic module is packaged into the first thermoplastic
(Continued)

material and the second thermoplastic material and a finished product is obtained after cooling and shaping.

6 Claims, 14 Drawing Sheets

(51) Int. Cl.

| | |
|---|---|
| ***B29C 43/20*** | (2006.01) |
| ***B29C 43/40*** | (2006.01) |
| ***B29C 51/12*** | (2006.01) |
| ***B29C 51/14*** | (2006.01) |
| ***B32B 37/10*** | (2006.01) |
| ***B32B 38/00*** | (2006.01) |
| *B29C 43/18* | (2006.01) |
| *B29K 101/12* | (2006.01) |
| *B29K 307/04* | (2006.01) |
| *B29L 31/30* | (2006.01) |

(52) U.S. Cl.
CPC ............ *B29C 43/203* (2013.01); *B29C 51/14* (2013.01); *B32B 38/0004* (2013.01); *B32B 38/0036* (2013.01); *B29C 2043/182* (2013.01); *B29K 2101/12* (2013.01); *B29K 2307/04* (2013.01); *B29K 2995/0026* (2013.01); *B29L 2031/30* (2013.01); *B32B 2250/03* (2013.01)

(58) Field of Classification Search
CPC ....... B29C 43/20; B29C 43/203; B29C 43/36; B29C 43/40; B32B 37/10; B32B 38/0004; B32B 38/0036; B32B 2250/03; H01F 71/00
USPC ............ 264/161, 219, 248, 297.1, 322, 334, 264/DIG. 65; 156/267, 308.2, 309.9
See application file for complete search history.

(56) References Cited

U.S. PATENT DOCUMENTS

| | | | | |
|---|---|---|---|---|
| 9,112,080 | B1 | 8/2015 | Corneille et al. | |
| 2009/0188603 | A1* | 7/2009 | Haller | B32B 39/00 156/359 |
| 2012/0168076 | A1* | 7/2012 | Suga | B32B 17/10788 156/308.2 |
| 2013/0052773 | A1* | 2/2013 | Brod | H10F 71/00 29/738 |

FOREIGN PATENT DOCUMENTS

| | | | | | |
|---|---|---|---|---|---|
| CN | 105810776 | A | | 7/2016 | |
| CN | 205440235 | U | | 8/2016 | |
| CN | 108831944 | A | | 11/2018 | |
| CN | 109624724 | A | | 4/2019 | |
| CN | 110739360 | A | | 1/2020 | |
| CN | 111590796 | A | | 8/2020 | |
| CN | 112397601 | A | | 2/2021 | |
| CN | 113573898 | A | | 10/2021 | |
| CN | 115122554 | A | | 9/2022 | |
| JP | 2008277652 | A | | 11/2008 | |
| JP | 2016131421 | A | * | 7/2016 | H02S 30/10 |
| KR | 20130008783 | A | * | 1/2013 | H01F 71/00 |
| TW | 201101518 | A | | 1/2011 | |
| WO | WO 2021069466 | | | 4/2021 | |

* cited by examiner

| Types of thermoplastic material | Temperature (°C) |
|---|---|
| Polystyrene (PS) | 150-190 |
| High impact polystyrene (HIPS) | 160-205 |
| Acrylonitrile Butadiene Styrene (ABS) | 150-205 |
| Polyvinyl chloride (PVC) | 110-150 |
| Low-density polyethylene (LDPE) | 125-175 |
| High-density polyethylene (HDPE) | 140-190 |
| Polypropylene (PP) | 140-165 |
| Polycarbonate (PC) | 175-230 |
| Polyethylene terephthalate (PET) | 125-165 |

Fig. 19

METHOD FOR PREPARING PHOTOVOLTAIC MODULE INTEGRATED WITH VEHICLE BODY

FIELD OF THE INVENTION

The present invention relates to the technical field of photovoltaic technology, particularly relates to photovoltaic module and fabricating method thereof.

BACKGROUND OF THE INVENTION

Most of the general vehicle-mounted photovoltaics are installed on brackets or directly pasted photovoltaic modules on the roof or body of the vehicle such as is disclosed in CN patent publication No. 201520898185.2. Another method is to use double-layer glass to encapsulate photovoltaic cells to form a roof skylight such as is disclosed in CN patent publication no. 202111594907.1 or a part of the roof.

The brackets or photovoltaic modules is arranged on the roof, or the vehicle body that will affect the appearance, the weight and the wind resistance also may be increased, which in turn will increase the fuel consumption or power consumption of the vehicle. The way of encapsulating photovoltaic cells with double-layer glass to make roof skylights or roofs can only be limited to the roof of vehicle. With the increasing popularity of electric vehicles, it is necessary to reduce the anxiety about the driving distance of electric vehicles, it is necessary to consider a larger available area to integrate photovoltaic power generation, such as hoods, doors, etc.

SUMMARY OF THE INVENTION

The object of this invention is to provide a photovoltaic module that can be fully integrated into the vehicle body or vehicle shell without affecting the appearance, or the fuel consumption or power consumption of the vehicle is not increased due to the weight of the bracket and the increase in wind resistance, and the internal stress caused by the cooling of the battery sheet can be reduced to reduce the damage of the battery cells, the photovoltaic module is not easy to deform and can be applied to large sized vehicle body.

In order to achieve the above object, the present invention provides a method for fabricating photovoltaic module integrated into the vehicle body. The vehicle body is divided into three components, which includes a hood, a door and a roof. The above components can be fabricated by using following fabricating method. The fabricating method includes the following steps:

S1: first, the mold is provided. The mold includes an upper mold and a lower mold. The upper surface of the upper mold is a first molding surface, and the lower surface of the lower mold is a second molding surface.

S2: secondly, the two pieces of the first thermoplastic material and the second thermoplastic material forming the components of the vehicle body are preheated to soften them.

S3: the first thermoplastic material and the second thermoplastic material are moved to dispose between the upper mold and the lower mold, and the peripheral of the thermoplastic material and the second thermoplastic material are clamped to fix.

S4: the upper mold is lowered, and the lower mold is lifted at the same time, so that the first thermoplastic material and the second thermoplastic material are attached to the second molding surface of the lower mold and the first molding surface of the upper mold respectively.

S5: the pre-packaged photovoltaic module is placed on the lower mold after heating and softening.

S6: the upper mold and the lower mold are driven to mold. The photovoltaic module is encapsulated into the first thermoplastic material and the second thermoplastic material under the operation of the high temperature and high pressure.

S7: after the first thermoplastic material and the second thermoplastic material are cooled and shaped, the upper mold and the lower mold are separated to obtain a semi-finished product, and then the excess edge material is cut off to obtain the product of the hood.

S8: the door and the roof of the vehicle are fabricated in the same way as above description to obtain the product of finished components.

Preferably, a protruded edge is provided around the first molding surface of the upper mold.

Preferably, a first thermoplastic material is a transparent PC board, and the second thermoplastic material is a transparent or opaque carbon fiber reinforced PC board.

Preferably, in the step S2, the heating temperature of the first thermoplastic material and the second thermoplastic material ranges from 100° C.-240° C.

Preferably, in the step S4, the upper mold and the lower mold are performed with vacuum exhausted.

Preferably, in the step S5, the photovoltaic module is heated to 40° C.-150° C., and the pre-packaging material of the photovoltaic module is one of TPE, TPU, TPO, TPSE, PVB, and an ionic intermediate mold. The appropriate temperature depends on the type of packaging material and the curvature of the molding surface.

Preferably, in the step S6, the upper mold and the lower mold are mold clamping, a weld wiring is formed by the first thermoplastic material and the second thermoplastic material under the operation of the high pressure at the edges.

By adopting the above steps, the invention is not only a photovoltaic module, but also a part of the vehicle body and the vehicle shell, which can be completely integrated into the vehicle body. The available area on the vehicle can be used as its own power generation to reduce vehicle fuel consumption or power consumption. It is not easily deformed and can be applied to larger-sized vehicle bodies.

BRIEF DESCRIPTION OF THE DRAWINGS

FIG. 19 shows the different molding temperature for various thermoplastic materials.

DETAILED DESCRIPTION OF THE PREFERRED EMBODIMENT

The present invention will be further described in detail below with reference to the embodiments given in the accompanying drawings.

Figure 1:
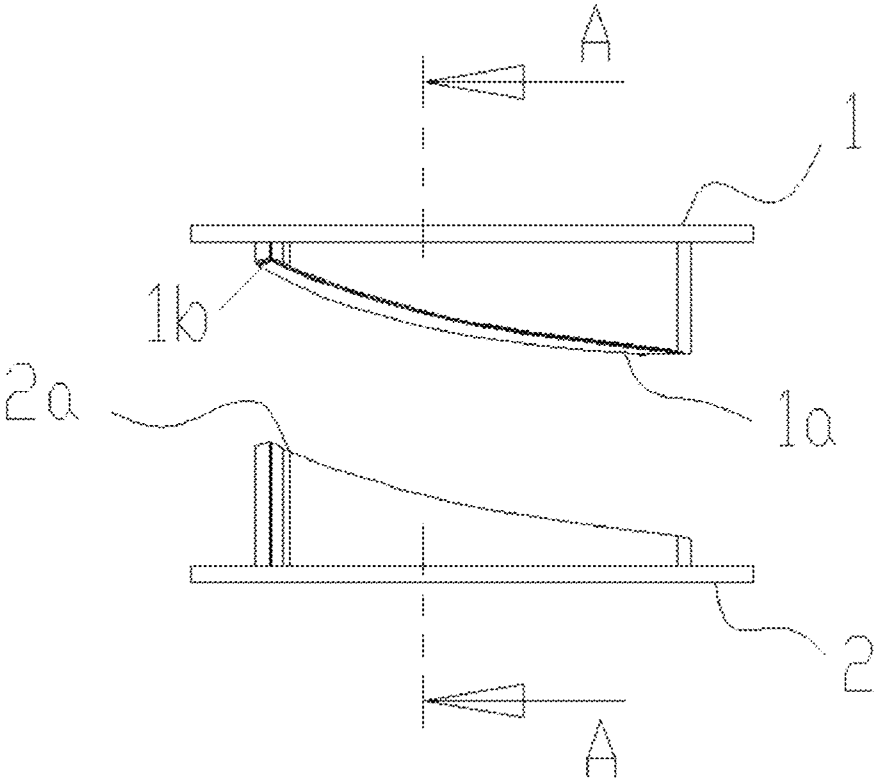
FIG. 1 is a schematic diagram showing an upper mold and the lower mold in accordance with this invention.
Figure 2:
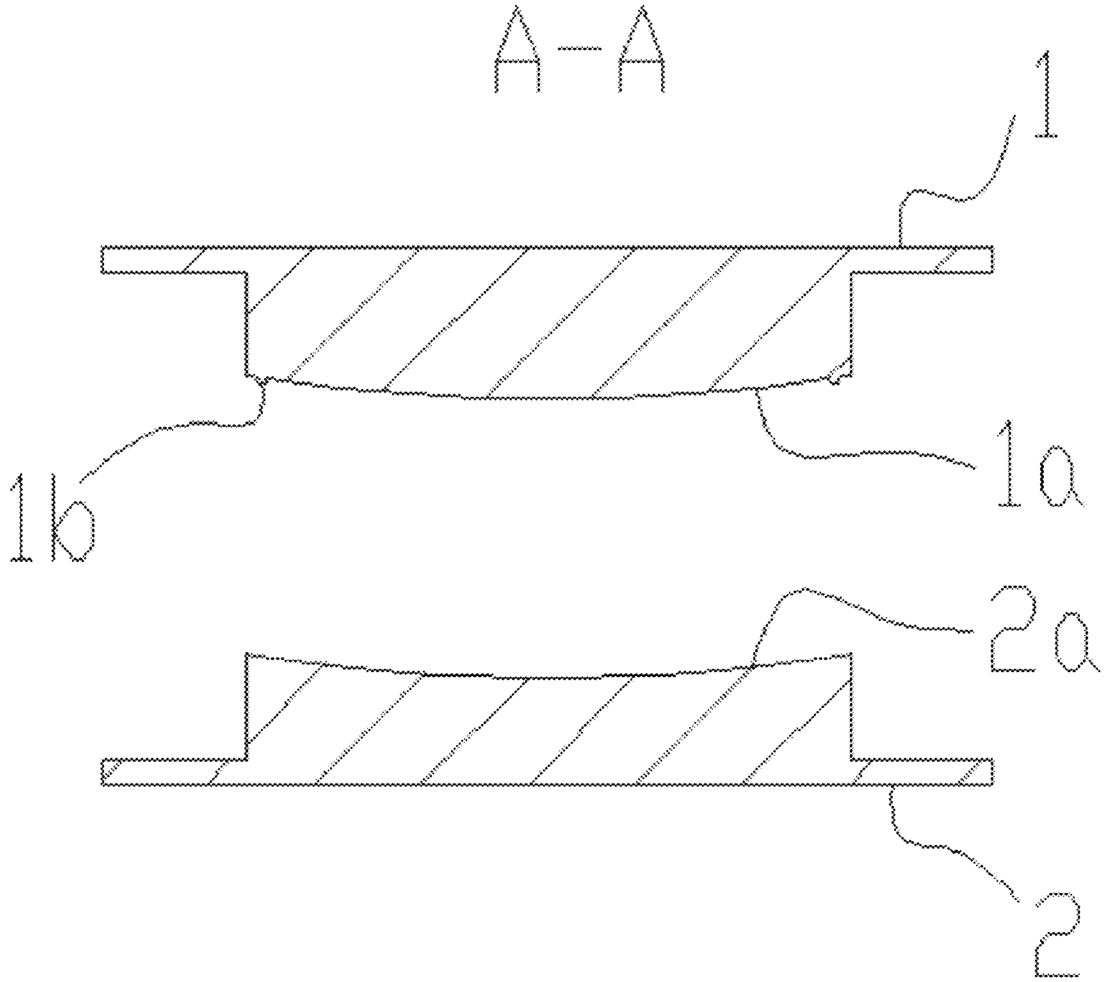
FIG. 2 is A-A sectional view of FIG. 1 in accordance with this invention.
Figure 12:
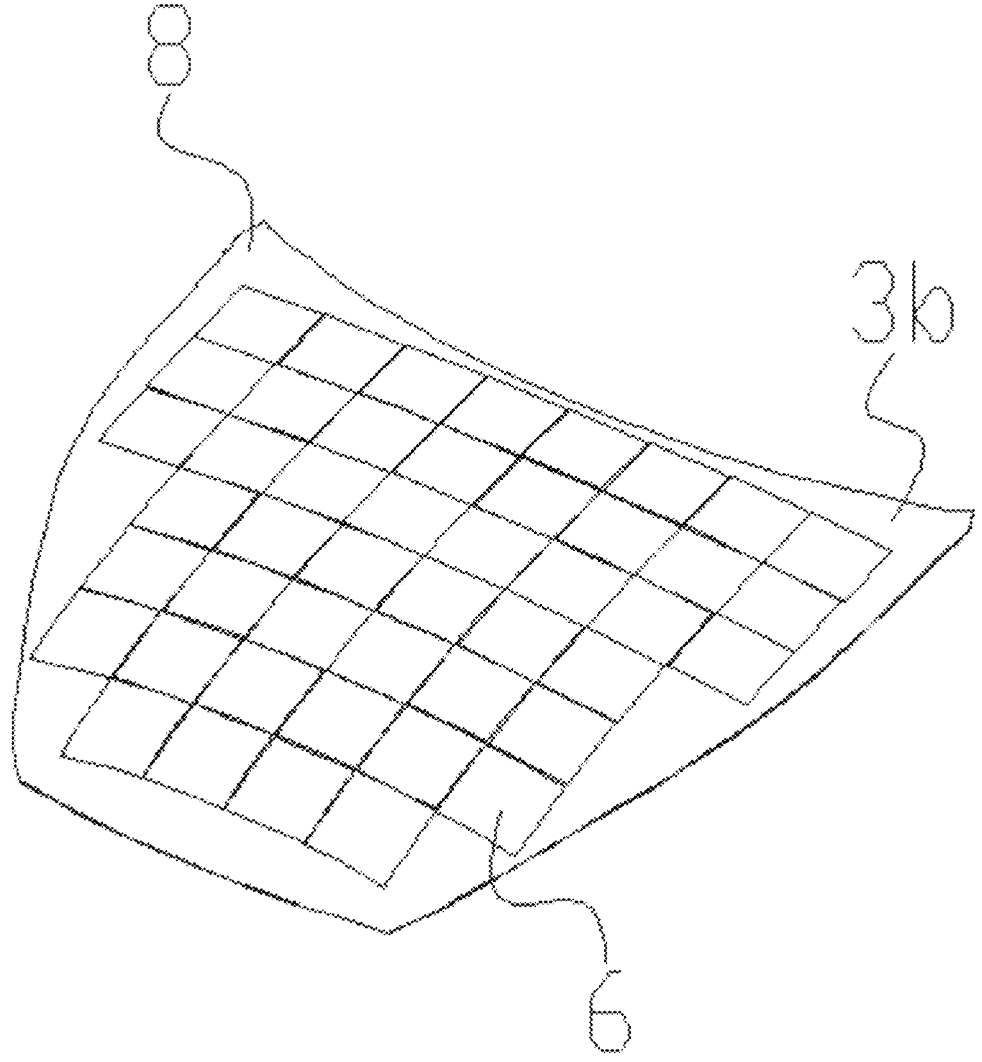
FIG. 12 is a three-dimensional view of the finished vehicle hood.
Figure 13:
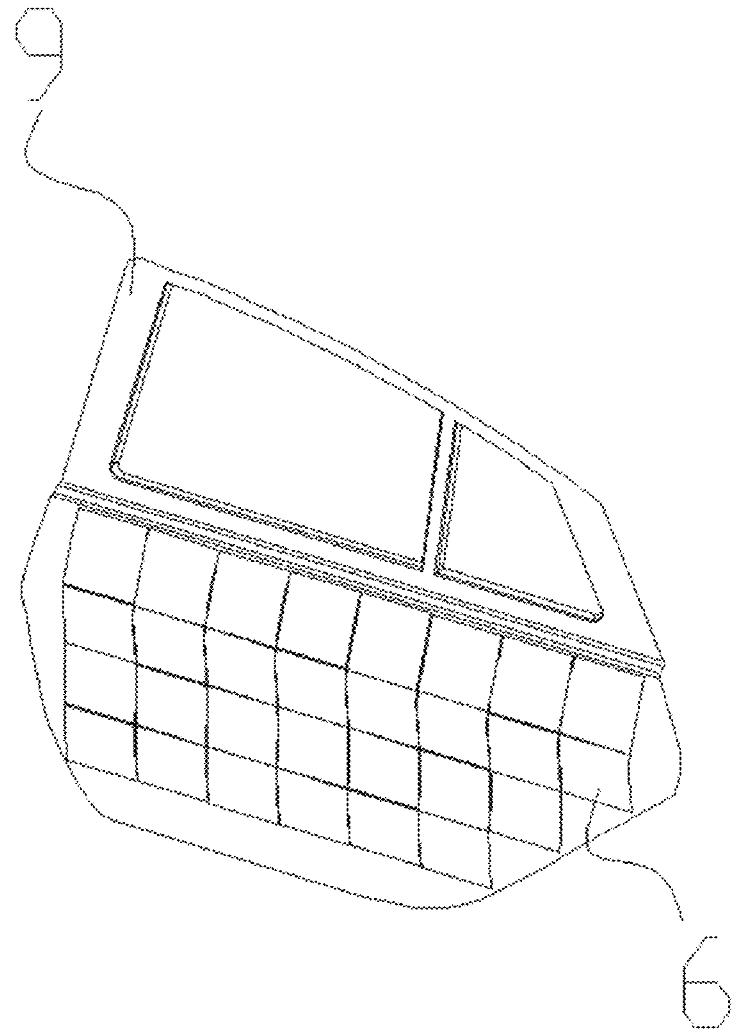
FIG. 13 is a perspective view of the door component.
Figure 14:
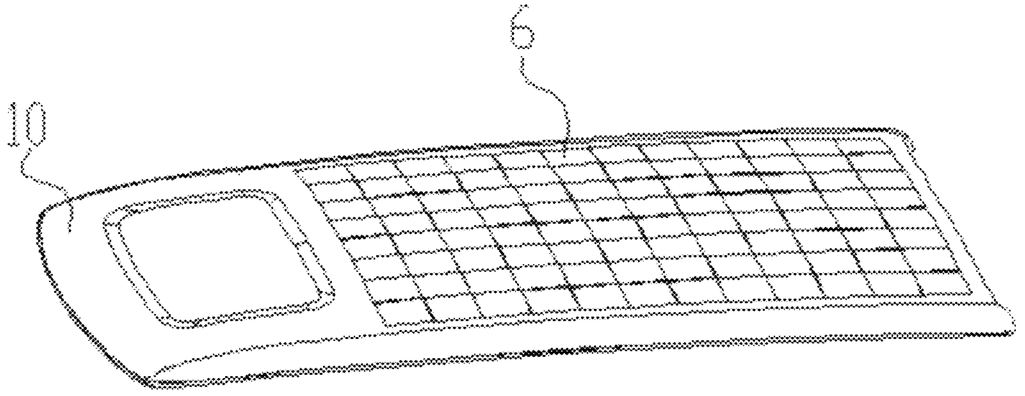
FIG. 14 is a schematic diagram of the vehicle roof component.

First embodiment: The present invention provides a method for fabricating a photovoltaic module integrated into a vehicle body as shown in FIGS. 12, 13 and 14. The vehicle body is divided into at least three components: a hood 8, a door 9, and a roof 10, and the above components can be fabricated by using the following fabricating method which includes the following steps:

As in FIG. 1 and FIG. 2, a mold is provided. The hood 8 is taken as an example. The mold includes an upper mold 1 and lower mold 2, an upper surface of the upper mold 1 is a first molding surface 1*a*, a lower surface of the lower mold 2 is a second molding surface 2*a*. The first molding surface 1*a* and the second molding surface 2*a* are designed according to the hood 8. A protruded edge 1*b* is provided around the peripheral of the first molding surface 1*a* of the upper mold 1, so that when the upper mold 1 is mold clamped with the lower mold 2, there is a greater pressure on the protruded edge 1*b*, and a cavity is formed between the first molding surface 1*a* and the second molding surface 2*a*, which is convenient for vacuuming and cutting the edge material, and may form a weld wiring 7.

Figure 3:
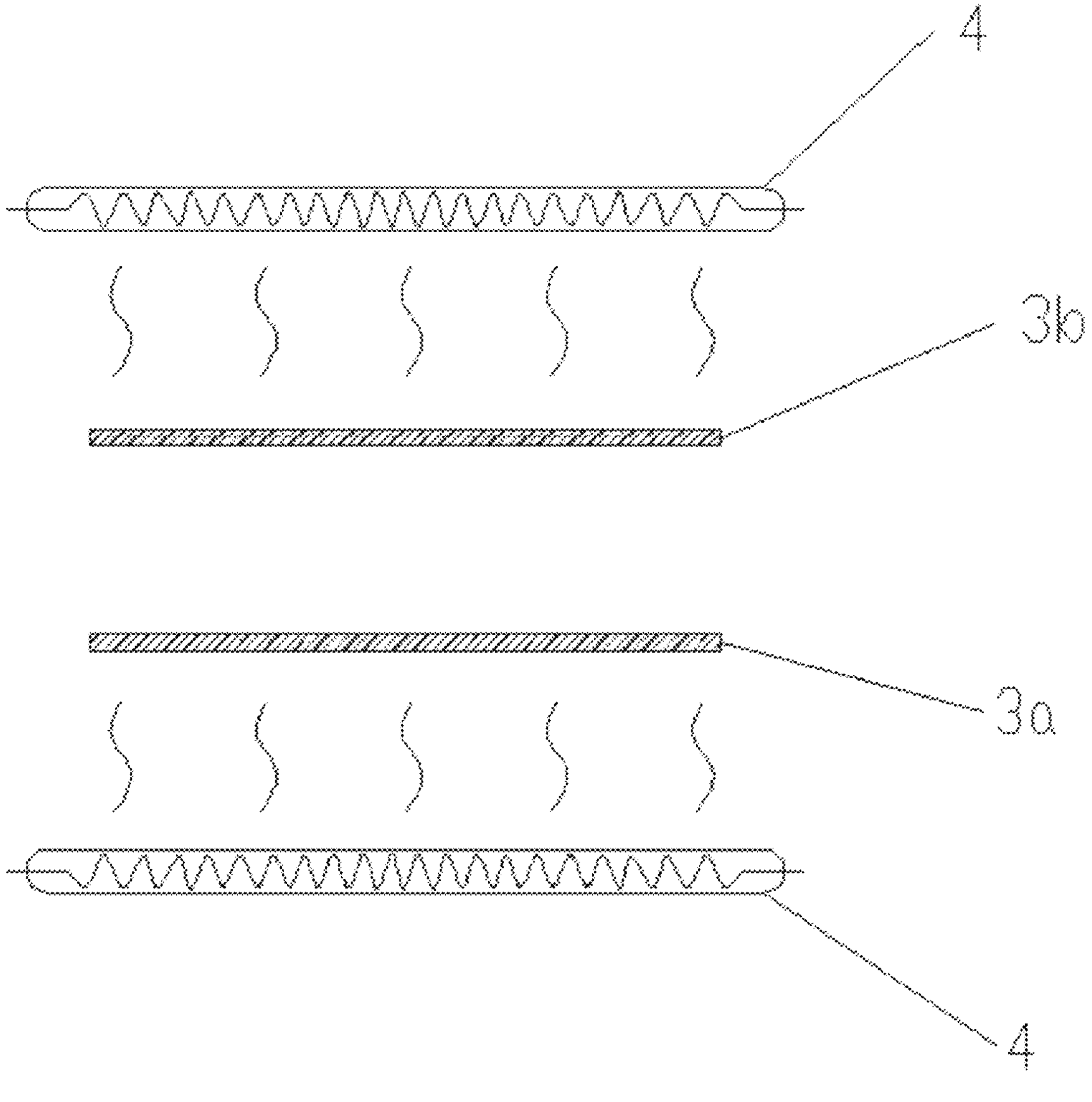
FIG. 3 is a schematic diagram of heating the first thermoplastic material and the second thermoplastic material.

As shown in FIG. 3, in this embodiment, the first thermoplastic material 3*a* is a transparent PC board, and the photovoltaic module 6 can absorb the sunlight. The second thermoplastic material 3*b* is an opaque carbon fiber reinforced PC board. The first thermoplastic material 3*a* and the second thermoplastic material 3*b* used for forming vehicle components which is pre-heating to soften, in which the heating temperature ranges from 100° C.-240° C., and the preferable temperature is 160° C. In this embodiment, the first thermoplastic material 3*a* and the second thermoplastic material 3*b* are heated by using electric heating tube 4.

Figure 4:
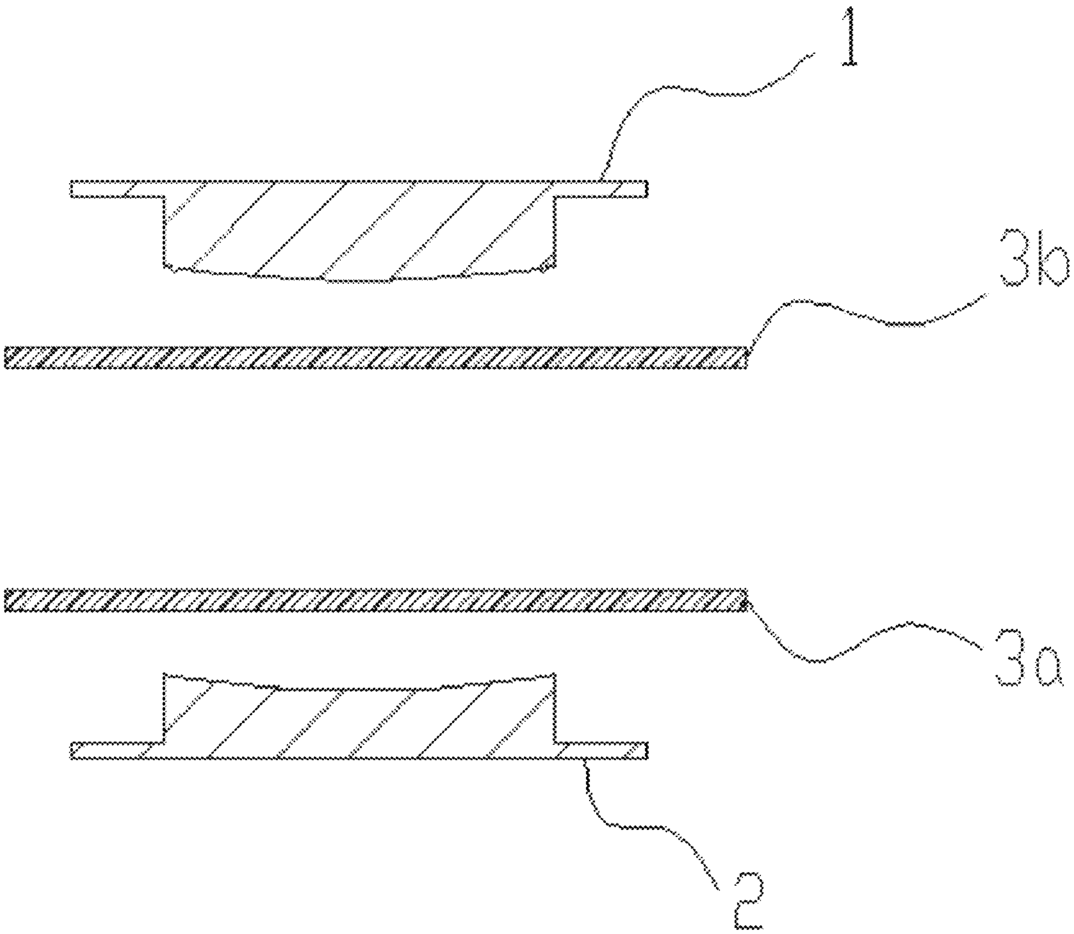
FIG. 4 is a schematic diagram of step S3.

As shown in FIG. 4, the upper mold 1 and the lower mold 2 are put into a blister machine, and the blister machine is convenient for lifting and lowing operations of the upper mold 1 and the lower mold 2 and is also convenient for vacuuming. The first thermoplastic material 3*a* and the second thermoplastic material 3*b* are moved to dispose between the upper mold 1 and the lower mold 2, and the peripheral of the first thermoplastic material 3*a* and the second thermoplastic material 3*b* are clamped to fix, so the upper mold 1 and the lower mold 3 can contact the first thermoplastic material 3*a* and the second thermoplastic material 3*b*. It should be illustrated to that the first thermoplastic material 3*a* and the second thermoplastic material 3*b* have a certain tension.

Figure 5:
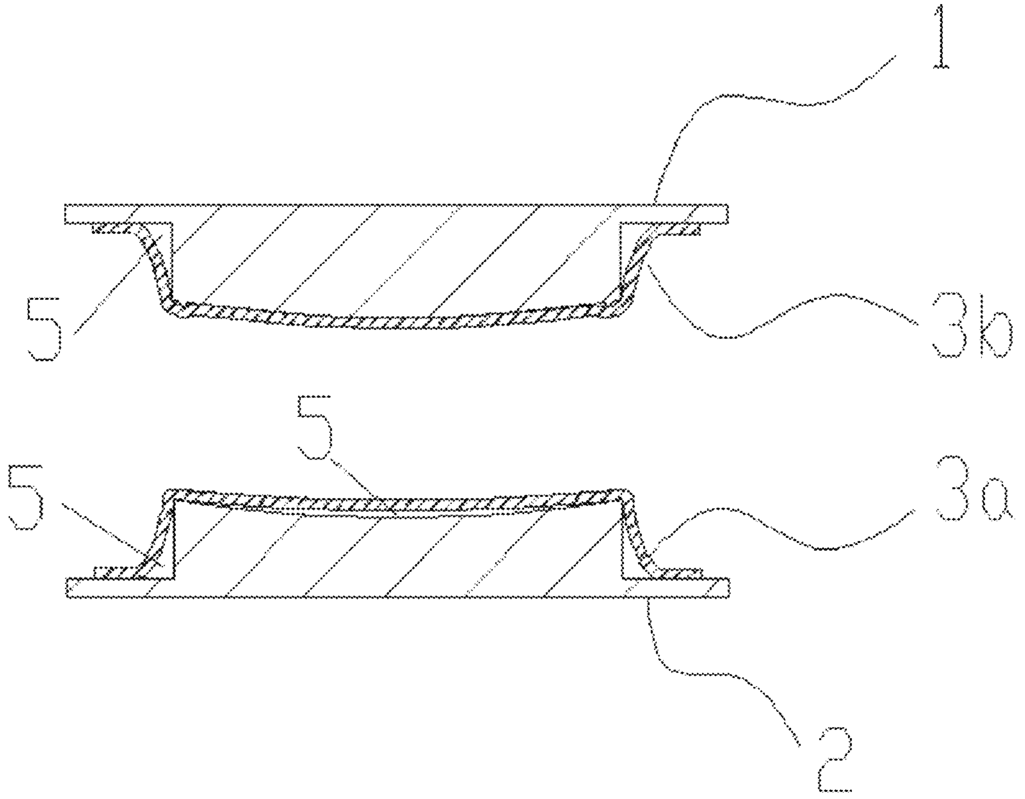
FIG. 5 is a schematic diagram of step S4.
Figure 6:
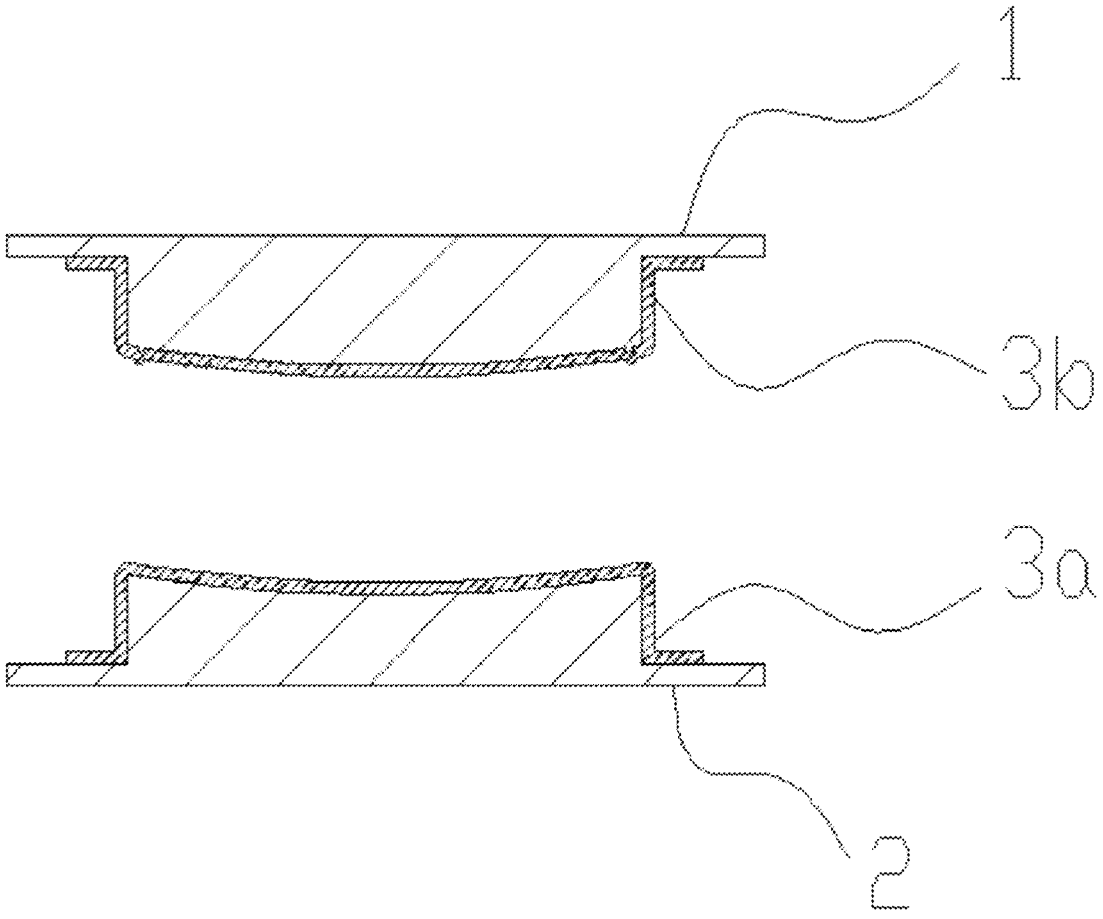
FIG. 6 is a schematic diagram of attachment after vacuuming.

As shown in FIG. 5 and FIG. 6, the upper mold 1 is lowered, while the lower mold 2 is lifted, so that the first thermoplastic material 3*a* and the second thermoplastic material 3*b* are respectively attached to the second molding surface 2*a* of the lower mold 2 and the first molding surface 1*a* of the upper mold 1. In order to adhere more closely, a blister machine is necessary to vacuum and remove all the gap 5 between the first thermoplastic material 3*a* and the second thermoplastic material 3*b* and the lower mold 2 and the upper mold 1, so that the adhesion becomes closer.

Figure 7:
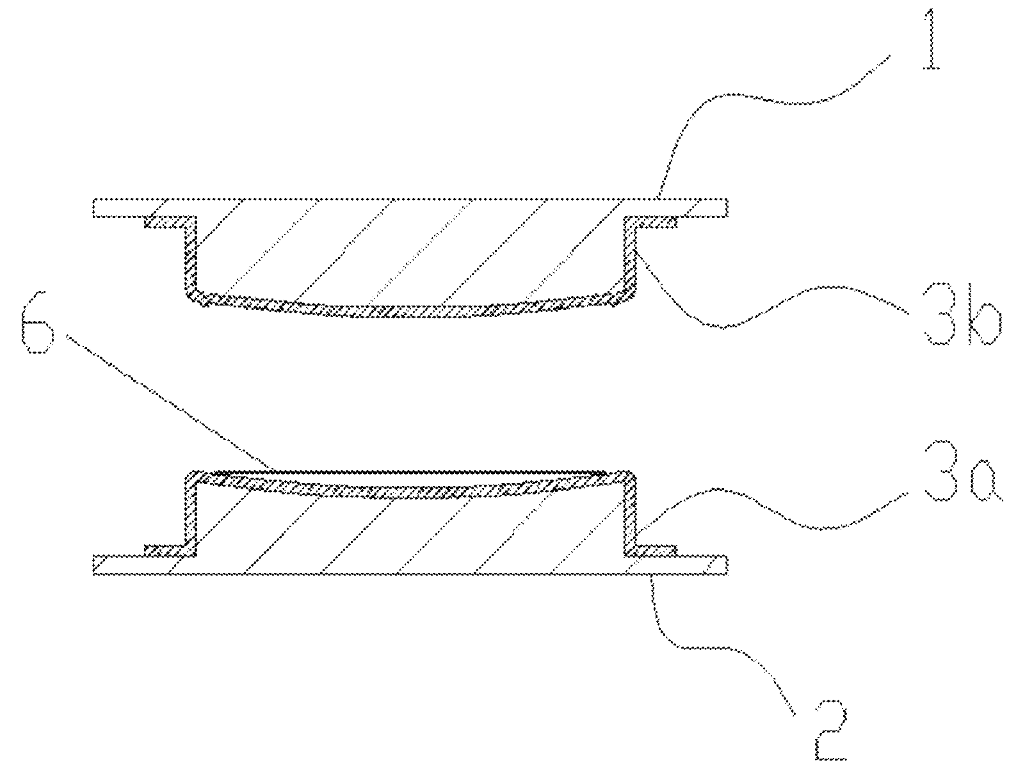
FIG. 7 is a schematic diagram of step S5.

As shown in FIG. 7, the pre-packaged photovoltaic module 6 is placed on the lower mold 2 after heating and softening, in which the heating temperature ranges from 40° C.-150° C., and the preferable temperature is 140° C., and the material of the photovoltaic module 6 is one of TPE, TPU, TPO, TPSE, PVB, an ionic intermediate mold.

Figure 8:
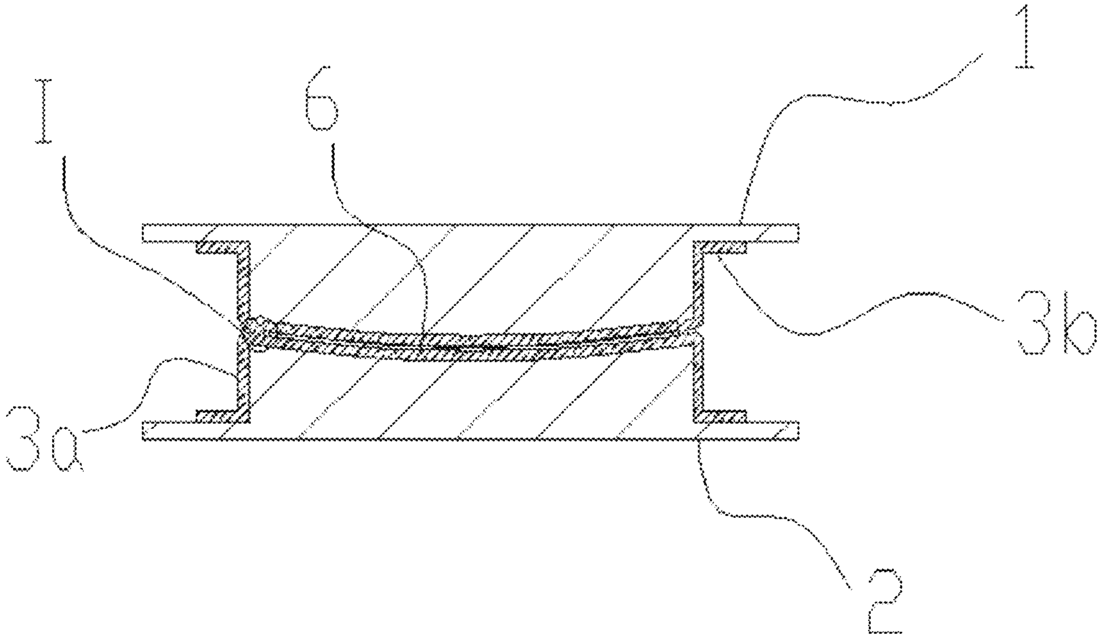
FIG. 8 is a schematic diagram of step S6.
Figure 9:
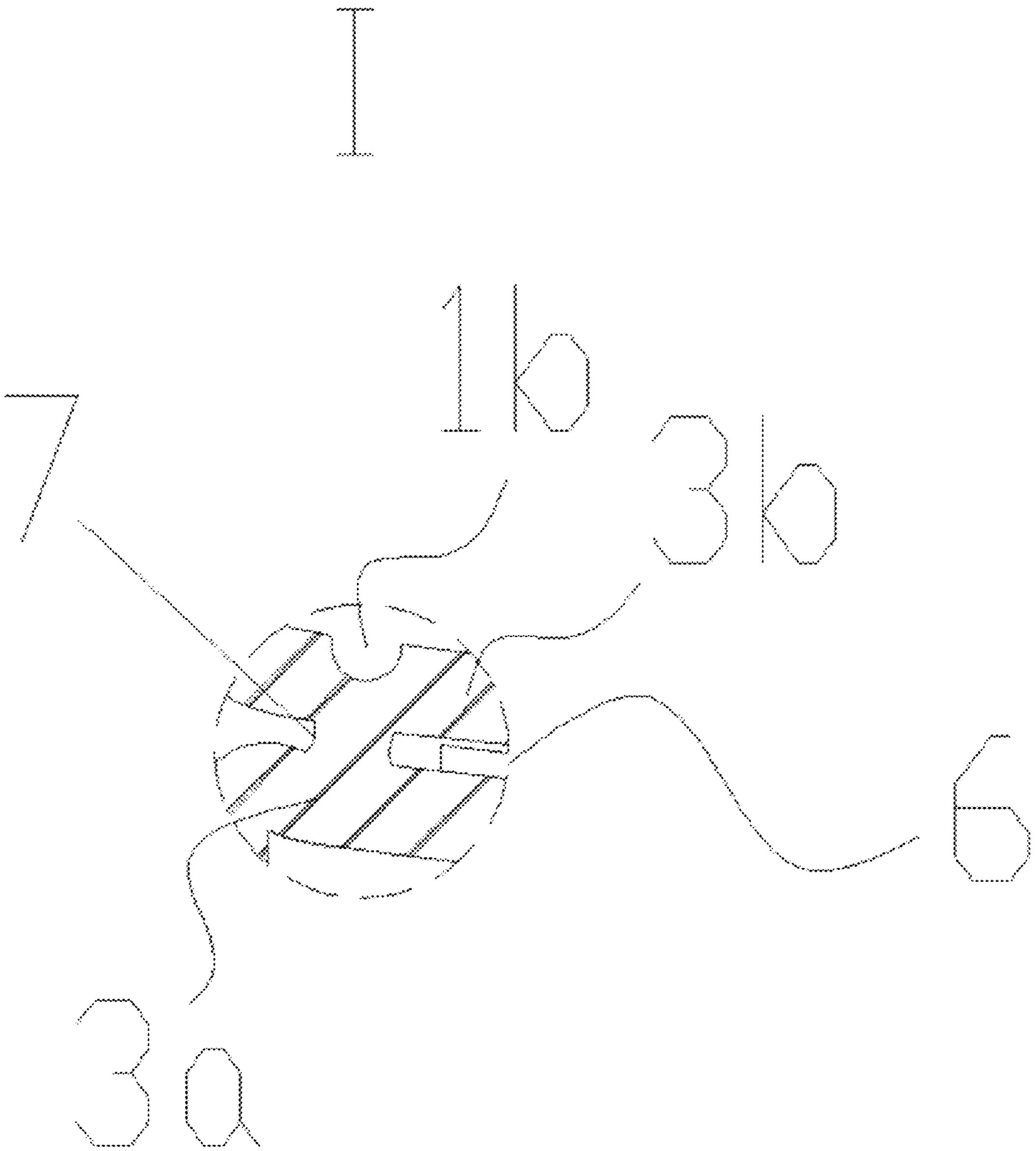
FIG. 9 is an enlarged view of component I in FIG. 8.

As shown in FIG. 8, the upper mold 1 and the lower mold 2 are driven to perform mold together under the operation of high temperature and high pressure. Please refer to FIG. 19, the temperature of each material is different, and the pressure ranges from 60-180 psi. The photovoltaic module 6 is encapsulated into the first thermoplastic material 3*a* and the second thermoplastic material 3*b*. As shown in FIG. 9, the upper mold 1 and the lower mold 2 is molded together, and the first thermoplastic material 3*a* and the second thermoplastic material 3*b* forms a weld wiring 7 under the operation of high pressure of the protruded edge 1*b*, so that the photovoltaic module 6 can encapsulate into the first thermoplastic material 3*a* and the second thermoplastic material 3*b* completely.

Figure 10:
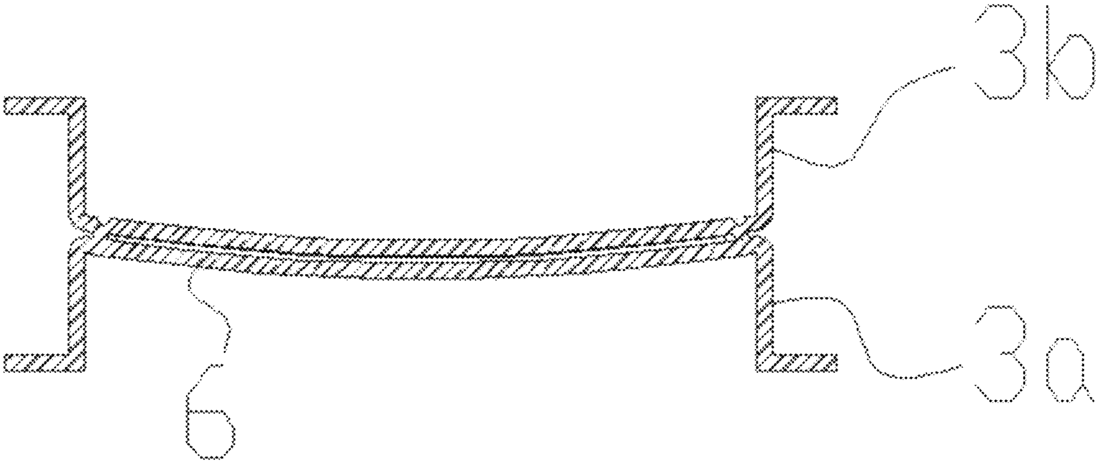
FIG. 10 is a schematic diagram of step S7.
Figure 11:
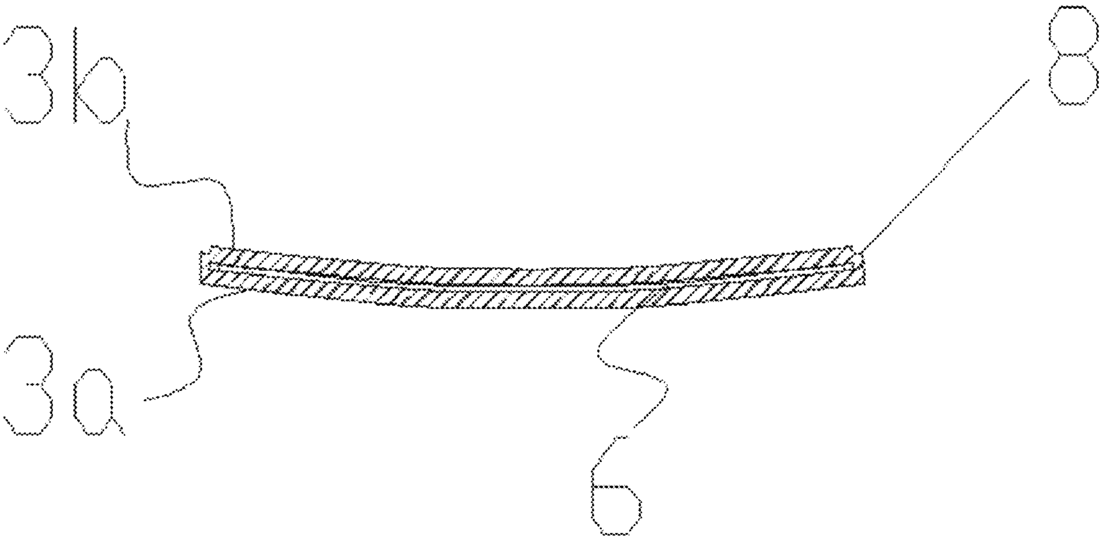
FIG. 11 is a schematic diagram of the finished vehicle hood.

As shown in FIG. 10, after the first thermoplastic material 3*a* and the second thermoplastic material 3*b* are cooled and shaped, the upper mold 1 and the lower mold 2 are separated to obtain a semi-finished product, and then the excess edge material is cut off to obtain the finished product, which is hood 8.

Figure 15:
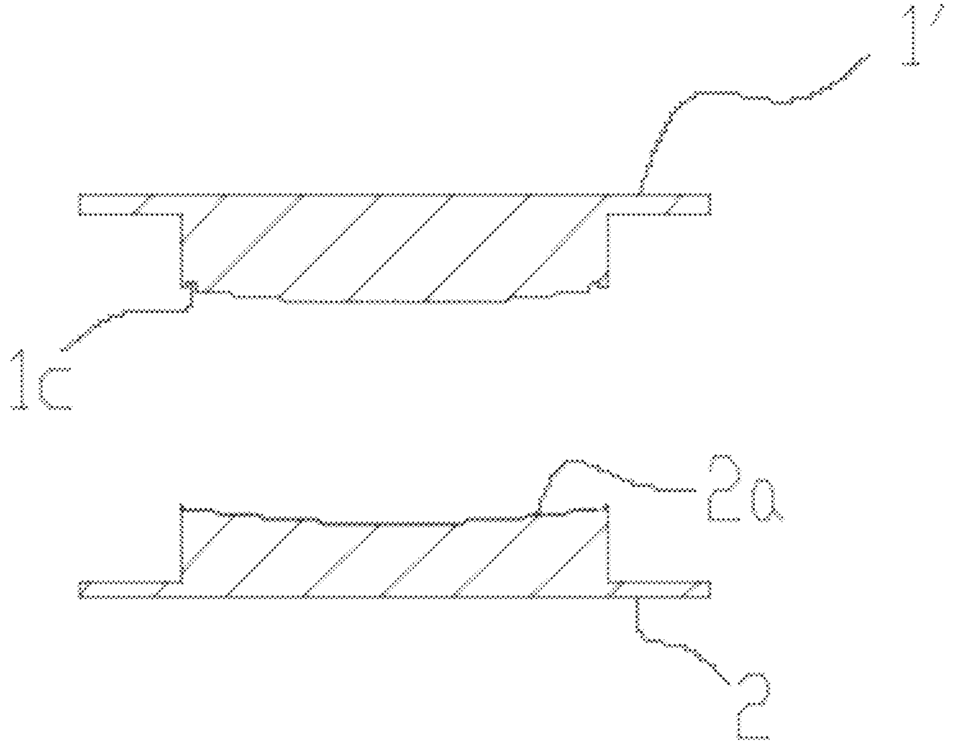
FIG. 15 shows a schematic diagram of the upper mold and the lower mold in embodiment 2.
Figure 16:
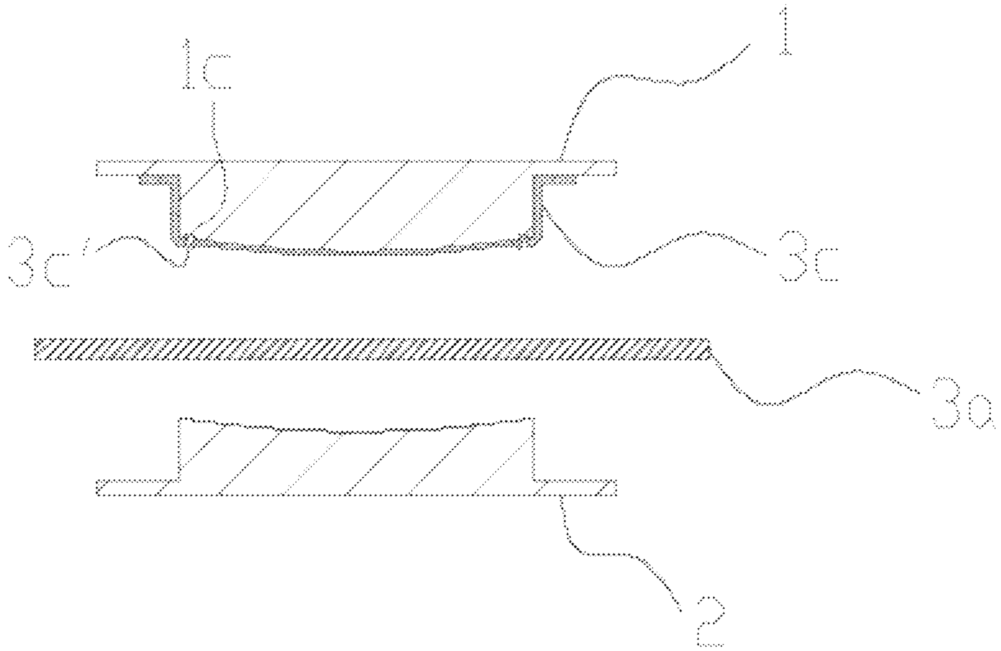
FIG. 16 is a schematic diagram of step s3' in embodiment 2.

Second Embodiment: In this embodiment, the second thermoplastic material 3*b* in step S2 is replaced with a pre-stamped metal piece 3*c*, the fabricating step are as follows: S1': a mold is designed firstly. A hood 8 is taken as an example as shown in FIG. 15. The mold includes an upper mold 1 and a lower mold 2, the edge of the upper mold 1 has an overflow groove 1*c*, and a lower surface of the lower mold 2 is second molding surface 2*a*.

S2': a piece of the first thermoplastic material 3*a* is pre-heated to soften.

S3': the pre-stamped metal piece 3*c* is moved to the upper mold 1, where the opening 3*c*' on the edge of the pre-stamped metal piece 3*c* overlaps the overflow groove 1*c* of the upper mold 1. The first thermoplastic material 3*a* is moved to dispose between the upper mold 1 and the lower mold 2, and the peripheral of the first thermoplastic material 3*a* is clamped to fix.

Figure 17:
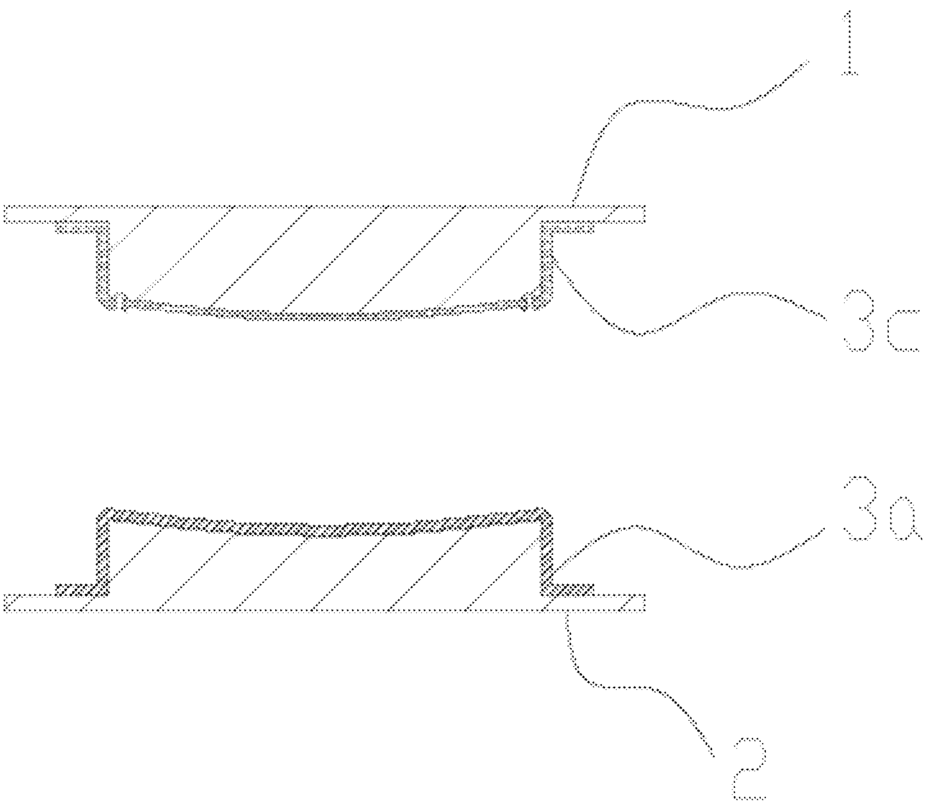
FIG. 17 is a schematic diagram of step s4' in embodiment 2.

S4': the lower mold 2 is lifted, so the first thermoplastic material 3*s* is attached to the second molding surface 2*a* of the lower mold 2 and then a vacuuming is performed as shown in FIG. 17.

Figure 18:
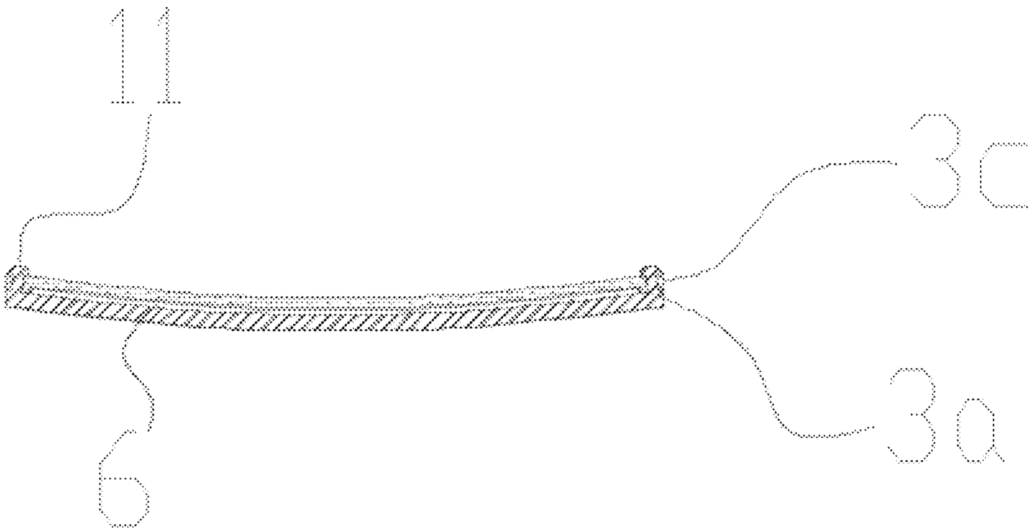
FIG. 18 is a schematic diagram of the finished vehicle hood in embodiment 2.

S5': the pre-packaged photovoltaic module 6 is placed on the lower mold 2 after heating and softening. The upper mold 1 and the lower mold 2 are driven to mold under the operation of high temperature and high pressure, the heating temperature is shown as in FIG. 19, which is distinguished by thermoplastic materials. The pressure ranges from 60-180 psi. The first thermoplastic material 3 reaches the overflow groove 1*c* of the upper mold 1 through the opening 3*c*' on the edge of the pre-stamped metal piece 3*c* due to extrusion. After cooling, the structure of rivet 11 is formed, as shown in FIG. 18. Next, the photovoltaic module 6 is encapsulated into the first thermoplastic material 3*a* and the pre-stamped metal piece 3*c*.

S6': after the first thermoplastic material 3*a* is cooled and shaped, the upper mold 1 and lower mold 2 is separated to obtain the semi-finished product, as shown in FIG. 18. Then, the excess edge material to obtain the finished product, which is hood 8.

The door 9 and the roof 10 and other components are prepared according to the above two different embodiments to obtain finished parts. The door 9 and the roof 10 are different from other components only in the corresponding upper mold 1 and lower mold 2, and the other components are different. The steps are the same as above.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation, so as to encompass all such modifications and similar structures.

What is claimed is:

1. A method for fabricating a photovoltaic module integrated into a vehicle body, the vehicle body being divided into a plurality of components, a hood, a door and a roof, each of the plurality of components being prepared by a fabricating method, comprising:

designing a mold including an upper mold and a lower mold, an upper surface of the upper mold being a first molding surface and a lower surface of the lower mold being a second molding surface, wherein a protruded edge is provided around a periphery of the first molding surface of the upper mold;

pre-heating a first thermoplastic material and a second thermoplastic material to soften;

moving the first thermoplastic material and the second thermoplastic material to dispose between the upper mold and lower mold;

clamping the first thermoplastic material and the second thermoplastic material to fix a periphery of the first thermoplastic material and the second thermoplastic material;

lowering the upper mold and lifting the lower mold to let the first thermoplastic material and the second thermoplastic material to attach the second molding surface of the lower mold and the first molding surface of the upper mold, respectively;

placing a pre-packaging photovoltaic module on the lower mold after heating and softening;

performing a molding process with driving the upper mold and the lower mold so as to the photovoltaic module is disposed between the first thermoplastic material and the second thermoplastic material;

separating the upper mold and the lower mold after the first thermoplastic material and the second thermoplastic material cooled and shaped to obtain a semi-finished product, and subsequently, cutting off excess edge material is cut off to obtain one of the plurality of components; and repeating the fabricating method to other components of the plurality of components.

2. The method for fabricating photovoltaic module integrated into a vehicle body according to claim 1, wherein the first thermoplastic material is a transparent PC board, and the second thermoplastic material is a transparent carbon fiber reinforced PC board or an opaque carbon fiber reinforced PC board.

3. The method for fabricating photovoltaic module integrated into a vehicle body according to claim 1, wherein a heating temperature of heating the first thermoplastic material and the second thermoplastic material ranges from 100° C.-240° C.

4. The method for fabricating photovoltaic module integrated into a vehicle body according to claim 1, further comprising performing a vacuum exhausting to the upper mold and the lower mold.

5. The method for fabricating photovoltaic module integrated into a vehicle body according to claim 1, further comprising heating a temperature of photovoltaic module is heated to 40° C.-150° C., wherein a pre-packaging material of the photovoltaic module is one of TPE, TPU, TPO, TPSE, PVB and ionic intermediate mold.

6. The method for fabricating photovoltaic module integrated into a vehicle body according to claim 1, forming a weld wiring by the first thermoplastic material and the second thermoplastic material under an operation of a high pressure at the protruded edge in said performing a molding process with driving the upper mold and the lower mold.

* * * * *